March 22, 1960  R. E. MILLER ET AL  2,929,736
HEAT AND PRESSURE RESPONSIVE RECORD MATERIAL
Filed July 25, 1957

FIG. 1

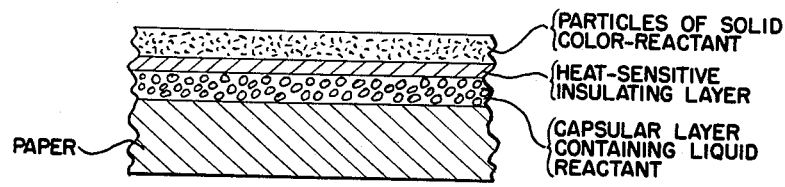

PARTICLES OF SOLID COLOR-REACTANT
HEAT-SENSITIVE INSULATING LAYER
CAPSULAR LAYER CONTAINING LIQUID REACTANT
PAPER

FIG. 2

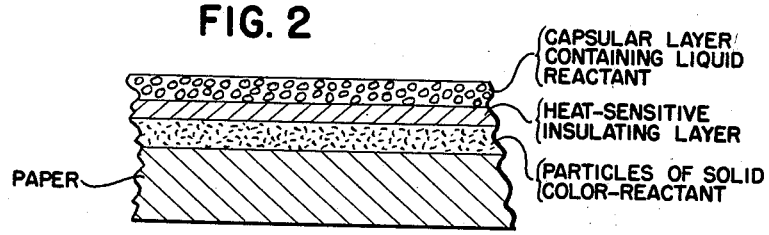

CAPSULAR LAYER CONTAINING LIQUID REACTANT
HEAT-SENSITIVE INSULATING LAYER
PARTICLES OF SOLID COLOR-REACTANT
PAPER

FIG. 3

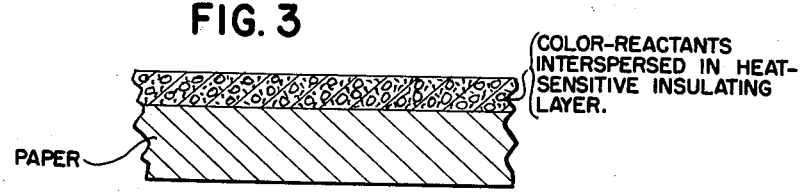

COLOR-REACTANTS INTERSPERSED IN HEAT-SENSITIVE INSULATING LAYER.
PAPER

INVENTORS
ROBERT E. MILLER
LOWELL SCHLEICHER

BY

THEIR ATTORNEYS

United States Patent Office 2,929,736
Patented Mar. 22, 1960

2,929,736

HEAT AND PRESSURE RESPONSIVE RECORD MATERIAL

Robert E. Miller and Lowell Schleicher, Dayton, Ohio, assignors to The National Cash Register Company, Dayton, Ohio, a corporation of Maryland Application July 25, 1957, Serial No. 674,033

4 Claims. (Cl. 117—36)

This invention relates to heat-and-pressure sensitive record material, and is an improvement over the record material disclosed in U.S. Patent No. 2,730,457, which issued on January 10, 1956, on the application of Barrett K. Green and Lowell Schleicher, the latter being one of the applicants herein.

In that U.S. Patent No. 2,730,457, there is disclosed a pressure-sensitive record material consisting of a base web having a coating thereon in which there are two reactant materials which may be brought into contact by marking pressures at room temperature to produce a distinctive color at the pressure points. One of the color reactants is dissolved in a liquid, droplets of which are contained in microscopic pressure-rupturable capsules which can be burst by marking pressures so that the released liquid can come into contact with the second reactant which is in the coating as a solid particulate material. The record material of that patent is very sensitive to pressure and color marks might be prematurely produced when such record material is wound into a roll or otherwise roughly handled. The reactant material held in the fluid in the capsules may be any one of the number shown or referred to in said patent such as crystal violet lactone, malachite green lactone, and other phthalide materials which react with acid clay-like solid particulate material, such as disclosed in said Patent No. 2,730,457, namely, attapulgite, magnesium trisilicate, and sodium aluminum silicate zeolite material, and equivalents. The crystal violet lactone, for instance, may be dissolved in an oil and the resultant solution encapsulated in a manner shown in U.S. Patent No. 2,800,457, which issued July 23, 1957, on an application of the above-mentioned Barrett K. Green and Lowell Schleicher. If crystal violet lactone, which is 3,3 bis (p-dimethylaminophenyl)-6-dimethylamino phthalide, carried by the oil in the capsules is released from the capsules by pressure and allowed to come in contact with the clay-like material, such as attapulgite, held on the web, a dark blue color is formed at the points of pressure where the capsules were ruptured. If malachite green is used instead of the crystal violet lactone, a greenish-blue color is produced. There are many other combinations of materials, disclosed in the reference patents, which can be used together as described to produce colors of different hue or intensity.

It is the object of this invention to improve this pressure-responsive material so that it is not so sensitive to pressure at ordinary temperatures and can be handled at room temperatures with safety, but which becomes very sensitive when combined heat-and-pressure is used to make a desired mark.

The invention will be described with reference to the drawing, in which Figs. 1 and 2 show a three-layer coating, with the insulating layer being in the middle, between the two color-reactant-carrying layers. Fig. 3 shows a species of the invention in which the two color-producing components and the insulating component are dispersed.

We propose to use as an insulating material separating the capsules from the solid reactant in the other particulate phase of the coating, a film of polyvinyl methyl ether. This film may be used in different ways. In one form of the invention, it may be used as a middle physical insulating layer between a layer of capsules and a layer of the solid particulate reactant, as for instance applying a coating of attapulgite on the base web, applying over the first coating a second coating consisting of a solution of the polyvinyl methyl ether in water and allowing the second coating to dry to form an insulating film, and, finally, applying as a top layer a coating of the capsules. This forms a film system not responsive to pressure at room temperature, but by the application of heat above room temperature in conjunction with pressure, the intervening polyvinyl methyl ether film is caused to rupture and allows a meeting of the escaped capsular-held liquid reactant to come in contact with the clay reactant to cause a color at the points of pressure. The proportion of materials used when reduced to solids content consists of about 15% of polyvinyl methyl ether, 7% of the clay, and 7% of the capsules, by weight, and the total coating thickness of ingredients should be no more than a few thousandths of an inch. With these proportions, and with a temperature of 50° centigrade, a mark is produced at the points of application of the pressure and heat in from two to three minutes, the heat causing failure of the insulating film of polyvinyl methyl ether. At 150° centigrade, the marks are produced instantaneously without any visible delay. At temperatures in between the main points, the time for the appearance of the mark is substantially proportional. The pressures are those ordinarily used in writing or printing. The heat may be obtained from heated type or a heated back-up plate for the record sheet.

In the preferred embodiment of the invention, the capsular coating and the solid-reactant coatings are made in the following manner, as disclosed in United States Letters Patent No. 2,730,457. To form the capsules, 20 grams of gum arabic is dissolved in 160 grams of water, and into this is emulsified 80 grams of trichlorodiphenyl containing 3% to 6%, by weight, of the two color-reactant materials 3,3-bis-(p-dimethylaminophenyl) 6-dimethylamino phthalide and benzoyl leuco methylene blue, preferably in equal amounts. The emulsion is carried on until the drop size of the oil is from 2 to 5 microns. Next, 20 grams of gelatin is dissolved in 160 grams of water and mixed with the emulsion. This gelatin preferably is made from pigskins and has a pH of 8 and a jelly strength of 275 grams, as measured by the Bloom gelometer. The pH of the mixture of colloid sols is adjusted to 6.5 with 20%, by weight, of sodium hydroxide in water. Three hundred grams of the so-adjusted mixture is diluted with 700 grams of water at 50 degrees centigrade, with agitation. The pH of the diluted mixture is then lowered to approximately 4.5 with 10%, by weight, of acetic acid in water, which causes coacervation resulting in the deposition of the colloid complex evenly and densely around each of the oil droplets individually. While still at 50 degrees centigrade, 2.19 grams of a 37% solution, by weight, of formaldehyde in water is added. No more than twenty minutes should elapse from the start of dilution to this point. Thereafter a gelation step is commenced by placing the mixture in an ice bath with agitation until it reaches 10 degrees centigrade. The pH then is adjusted to 9 with 20%, by weight, of sodium hydroxide in water to promote the hardening of the capsules. This material may be coated on paper without further water adjustment, or its viscosity may be adjusted by adding water or removing it. At this stage, the colloid coating composition is a creamy white fluid. This forms the capsular coating as a liquid dispersion.

The solid-reactant coating as a liquid dispersion is made, according to said Patent No. 2,730,457, by cooking 20%, by weight, of paper coating starch in water at 200 degrees Fahrenheit for fifteen minutes and cooling it to room temperature. Separately, one part, by weight, of attapulgite is dispersed in three parts, by weight, of water, by use of a ball mill or equivalent. Four parts, by weight, of the attapulgite dispersion is mixed with one part, by weight, of the starch solution. The resultant mixture is applied at room temperature to the paper and allowed to dry. This coating of attapulgite may be of the order of .0005 of an inch. This forms the capsular coating as a liquid dispersion. Either the capsular coating or the solid-reactant coating is coated first on a paper sheet and allowed to dry. Next, the polyvinyl methyl ether, as a water solution, is coated on top of the first coating and allowed to dry. Finally, the other color-reactant coating, whether it be the capsular coating or the solid-particle coating, is coated on top of the dry polyvinyl methyl ether coating and allowed to dry. These coatings are made sufficiently thick to give the proportions of solids noted; namely, 7% capsules, 7% solid-reactant, and 15% polyvinyl methyl ether.

The foregoing is the preferred embodiment of the invention, that is using a middle layer of the insulating material. The reactant crystal violet lactone held in the capsules may constitute either the bottom layer or the top layer.

In another embodiment of the invention, the three materials, that is, the clay dispersion, the capsular dispersion, and the film-forming material, polyvinyl methyl ether in solution, may be mixed together and applied as a single coating and dried to leave a similar proportion of solids content as mentioned with regard to the preferred embodiment. In such embodiment the reactant substances are interspersed but normally held from reaction contact by the insulating film of polyvinyl ether.

The action of the insulating layer in breaking down and allowing the reactants to come together at the points of heat and pressure seems to be that heat causes the film to form a discontinuous phase, which re-forms to a continuous phase upon cooling so as to again make the record material immune to mere pressure.

There are several other ways to apply the coatings to the base web material, one being to mix the solution of polyvinyl methyl ether with clay and apply it as a layer after which the capsules are added, or to mix the capsules with the solution of polyvinyl methyl ether and applying it first and then the clay coating.

Inasmuch as pressure at room temperature will rupture the capsules and release the fluid, although it cannot get to the particulate solid reactant at that time, the later addition of heat will develop an unwanted colored mark, unless provision is made to prevent such. If the liquid in which the color-reactant is carried in the capsules is a highly volatile one, such as diethylbenzene, it will evaporate when released by pressure alone from the capsules, leaving the dissolved color reactant in solid form. Subsequent heat applied will not form a mark because of the immobility of the formerly mobile reactant.

The invention is not to be deemed limited in the kind of color reactants carried by the capsules or by the particular clay mentioned, as the novelty resides in the use of a physical insulating film which is effective at room temperatures but which fails at temperatures of the order of 50°–150° centigrade.

What is claimed is:

1. A heat-and-pressure sensitive record material including, in combination, a record material sheet; and a coating on a surface of the sheet which coating contains microscopic pressure-rupturable capsules each containing a color-reactant liquid, solid particulate material which causes the liquid to assume a distinctive color when coming in contact therewith, and a thin film of polyvinyl methyl ether which is physically intact and insulating the capsules from the particulate material at room temperature so that if marking pressures alone are applied to the material at room temperatures and capsules are ruptured to release the reactant liquid, the liquid cannot come into contact with the solid particulate material, to produce a mark; and said film material failing so-to-insulate at temperatures substantially above room temperature, so that if heat-and-pressure are applied to desired areas, the liquid will make contact with the particulate material to produce the distinctive color in those areas.

2. The record material of claim 1 in which the capsules form one layer of the coating, the particulate material another layer of the coating, and the insulating film an intermediate layer of the coating.

3. The record material of claim 1 in which the capsules, the particulate material, and the insulating material are interspersed.

4. The record material of claim 1 in which the liquid in the capsules is highly volatile at room temperatures.

References Cited in the file of this patent

UNITED STATES PATENTS

| | | |
|---|---|---|
| 2,711,375 | Sandberg | June 21, 1955 |
| 2,712,507 | Green | July 5, 1955 |
| 2,800,457 | Green | July 23, 1957 |
| 2,800,458 | Green | July 23, 1957 |